May 21, 1935.  C. A. HITCHCOCK  2,002,179
TRACTOR ATTACHMENT FOR BROADCAST SEEDERS
Filed July 28, 1933   2 Sheets-Sheet 1
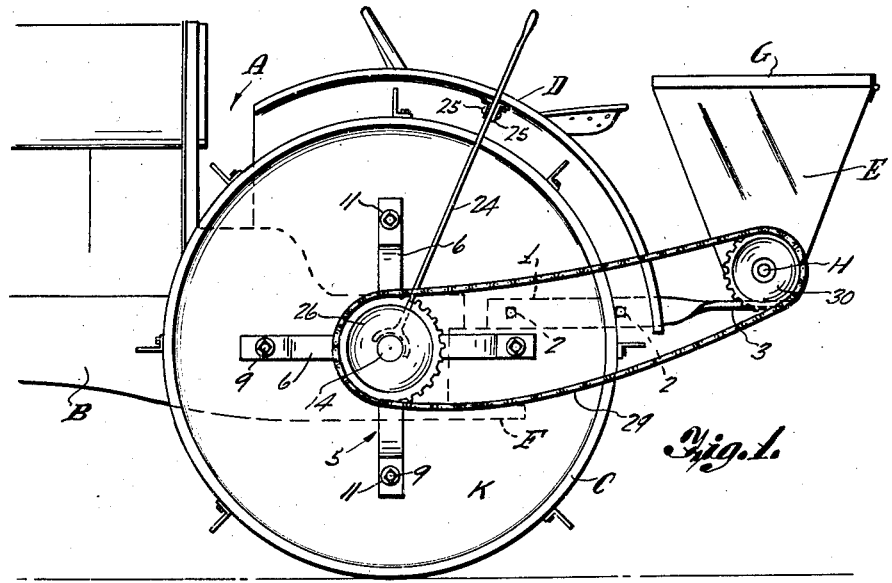
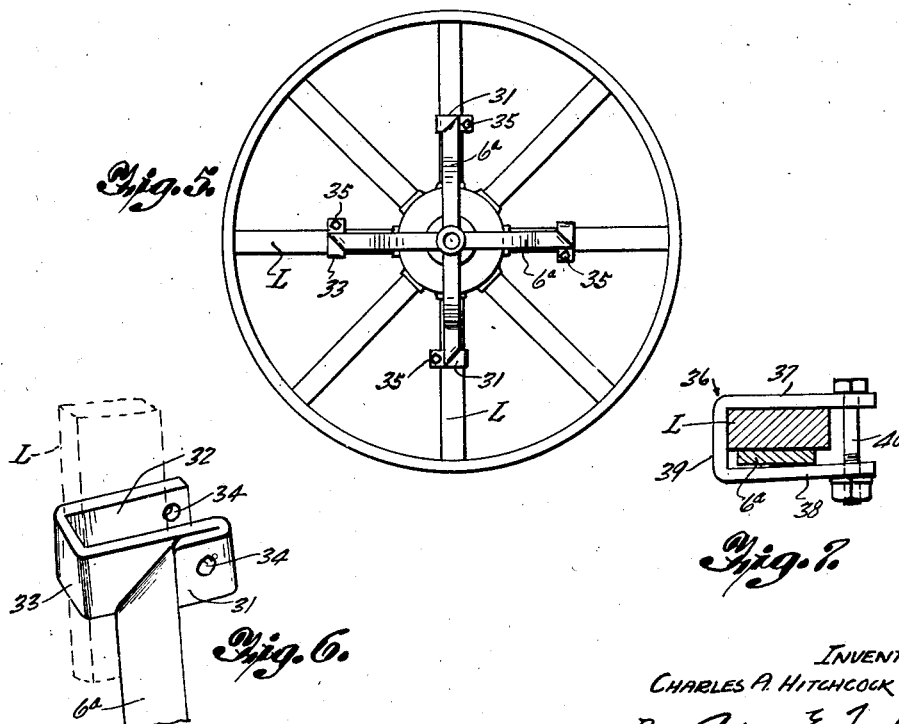
INVENTOR
CHARLES A. HITCHCOCK
By Adam E. Fisher,
ATTORNEY

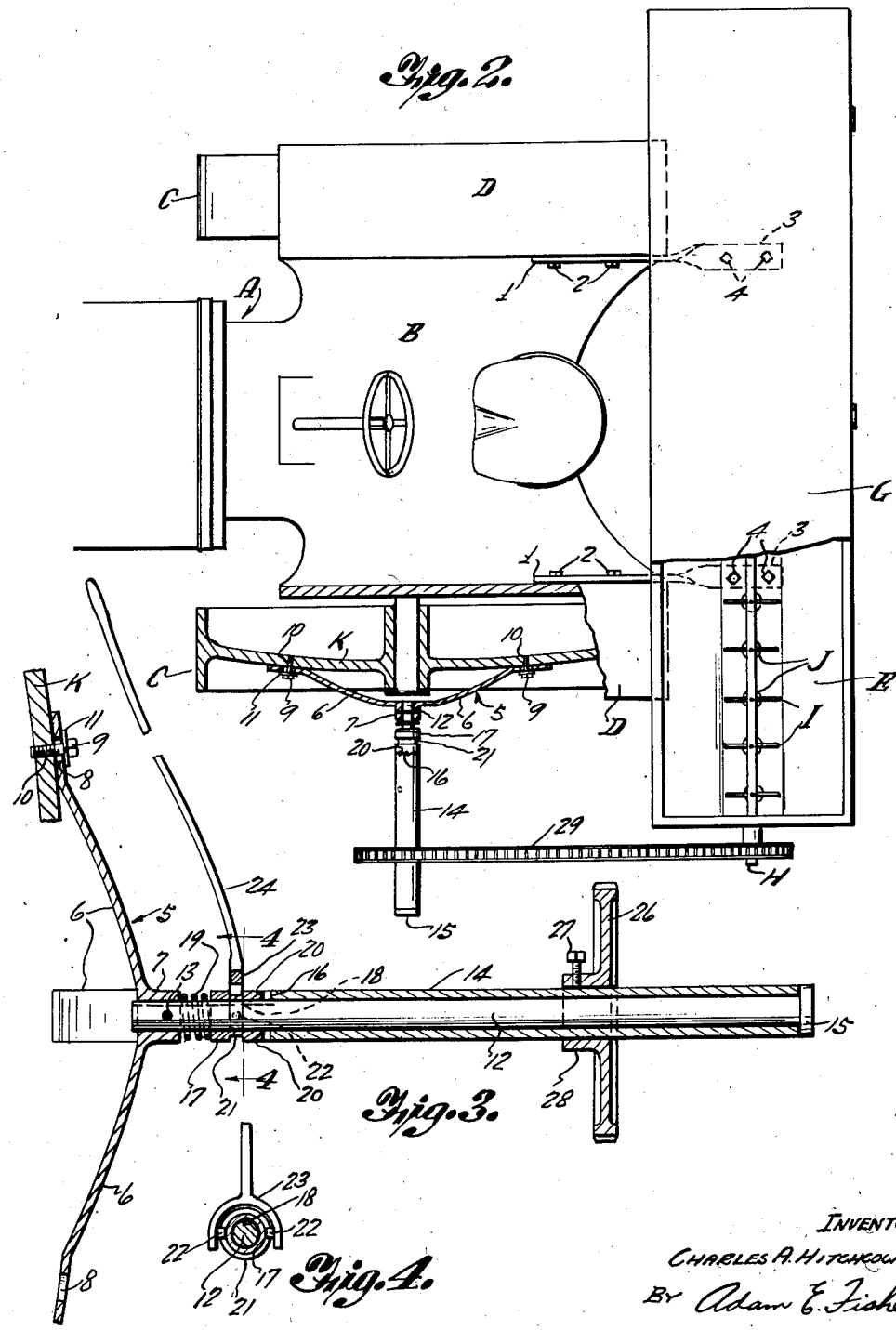

Patented May 21, 1935

2,002,179

UNITED STATES PATENT OFFICE 2,002,179

TRACTOR ATTACHMENT FOR BROADCAST SEEDERS

Charles A. Hitchcock, Pana, Ill.

Application July 28, 1933, Serial No. 682,647

1 Claim. (Cl. 74—15)

My invention relates generally to improvements in agricultural implements and more particularly to a broadcast seeder attachment for tractors.

The main object of the invention is to provide a means whereby a conventional broadcast seeder box may be mounted on a tractor and driven by one of the drive wheels thereof to plant any form of seed immediately back of the tractor and in front of a disk or other covering element drawn by the tractor. One man may thus plant and cover the seed in one operation and no seed is left exposed due to differences in the speed and work of the seeder and disk as commonly occurs when these two are driven separately.

Another object is to provide a support for the seeder box on the tractor and a driving means for the agitators in said box, this driving means comprising a shaft extended laterally from one tractor wheel in axial alignment therewith, a sleeve journaled on this shaft and carrying an adjustable sprocket wheel connected by a sprocket chain to the seed box agitators, and a clutch adapted to connect the said sleeve rigidly to the shaft when the seeder is in use or to disconnect the sleeve when the seeder is not in use.

A further object is to provide a novel and efficient means for attaching a shaft to the tractor wheel as described and properly centering said shaft in axial alignment with the wheel and its axle.

With the foregoing and other objects in view my invention resides in the novel construction and arrangement of parts as hereinafter set forth and claimed, reference being had to the accompanying drawings wherein:

Figure 1 is a side elevation of the rear portion of a tractor showing my invention applied thereto.

Figure 2 is a plan view of the structure in Figure 1, a part of one tractor wheel being shown in section and a part of the seeder box top broken away.

Figure 3 is an enlarged longitudinal section through the operating sleeve, wheel spider, clutch and sprocket wheel and a fragment of the tractor wheel.

Figure 4 is a section along the line 4—4 in Figure 3.

Figure 5 is a side elevation of a tractor wheel of the type using spokes and showing a modified form of wheel spider for attachment to the spokes.

Figure 6 is an enlarged perspective view of one of the spoke clamps formed on the spider arm as shown in Figure 5, a part of one wheel spoke being shown in dotted lines.

Figure 7 is a plan view of another form of spoke clamp, showing a wheel spoke and spider arm in cross section.

Referring now with more particularity to the drawings the reference character A designates a tractor including the chassis B, rear drive wheels C, and fenders D and E designate a conventional elongated rectangular and downwardly tapering broadcast seeder box having the lid G and the agitator shaft H carrying paddles I adapted to force the seed out through the seed openings J. These elements are all of conventional form and no invention therefor is claimed herein.

In accordance with my invention hanger or supporting traps or brackets I are secured by bolts 2 to the inner sides and rear portions of the fenders D or to frame of tractor and extend rearwardly therefrom and are twisted through an arc of ninety degrees so as to present horizontal tangs 3 adapted to support the seeder box E to which they are secured by bolts 4, the said box being thus supported across the rear of the tractor immediately back of the fenders. The seeder box is supported of course clear of the usual draw bar F of the tractor so that any disk, plow or other implement may be hitched to the tractor and drawn along behind the seeder if desired. The length of the usual seeder box is such that it will when mounted as described extend at its ends beyond the sides of the tractor for some distance as shown.

A wheel spider 5 is provided including arms 6 radially extended from a central hub 7 and apertured near their ends at 8 whereby they may be secured by screws or bolts 9 to one of the tractor wheels C, these wheels being as shown in Figures 1, 2 and 3 of the disk type having a solid circular web or disk K which may be suitably apertured and tapped as at 10 to receive the said mounting screws 9. The arms 6 are bent or curved outwardly toward the hub 7 so as to support this hub outwardly of the tractor wheel hub and axle and the two hubs may be brought into axial alignment by properly locating the screws 9 in the wheel. To compensate for minor errors in locating these bolts the clearance apertures 8 in the arms 6 are made considerably larger than the screws so that the arms and spider may be slipped about on the wheel and then finally secured in the proper position by large lock washers 11 placed under the screw heads and overlying the arms around the apertures.

A shaft 12 is rigidly mounted as by a pin 13 in the spider hub 7 and extends outwardly therefrom a distance at least equal to the lateral projection of the seed box E and shaft H on that side and as the tractor wheel supporting this shaft rotates in the normal travel of the tractor this shaft is of course rotated. Proper positioning of the spider 5 as described causes this shaft 12 to rotate evenly on its axis and prevents any wobbling or oscillation as would be the case were it off center. An elongated sleeve 14 is journaled freely on the shaft 12 and is of such length as to extend from the outer end thereof inwardly and terminate a short distance from the hub 7. The outer end of the sleeve 14 rests against a diametrically enlarged head 15 formed on the outer end of the shaft 12 and at its inner end the sleeve is provided with angularly cut clutch teeth 16. A clutch collar or sleeve 17 is slidably keyed as at 18 on the shaft 12 between the sleeve 14 and hub 7 and is normally urged outward on the shaft toward the sleeve by an expansion coil spring 19 coiled around the shaft and braced between the hub and clutch collar. At its outer end the clutch collar has mating or complementary clutch teeth 20 adapted to normally mesh with the teeth 16 on the sleeve 14 whereby said sleeve is locked to and caused to rotate with the shaft 12. Said clutch collar 17 also has an annular raceway or groove 21 around its outer periphery in which pins 22 on the ends of a shifter fork 23 may play as the clutch rotates, said fork 23 being formed at the end of a control lever 24 extended upward and inward alongside the fender to a point convenient to the driver's seat and being fulcrumed intermediate its ends between brackets 25 secured to said fender as shown in Figure 1.

A sprocket wheel 26 is mounted by a set screw 27 through its hub 28 on the sleeve 14 and a sprocket chain 29 is trained over this wheel and another 30 mounted on the extended end of the seed box agitator shaft H.

In use the seed (not shown) is placed in the seed box E and the disk or plow (also not shown) is connected in usual manner to the draw bar F. The tractor being then set in motion over the field the agitator shaft H is rotated by shaft 12 and through the sprockets 26 and 30 and chain 29 as will be readily understood and the seed is thus discharged through the openings J onto the ground. The following disk or plow then covers the seed in the usual manner and it will be apparent that by this arrangement all the seed planted will be immediately covered and no seed will be left exposed should it be necessary to stop before the field is planted as is the case where the seeder and disk are separately driven. Also one man and one tractor perform the same operations as required two men and tractors or two men, one tractor and one team at present. When the operation of the seed box is not desired as for instance when the tractor is in reverse or moving from field to field the driver simply pushes outward on the upper end of the control lever 24 slipping the clutch collar 17 inward on the shaft 12, disengaging the clutch teeth 16 and 20 and allowing the shaft to turn freely within the sleeve 14 without operation thereof. Upon releasing the lever 24 the spring 19 returns the clutch to normal engaged position. The same assembly of shaft 12, sleeve 14, clutch 17 and sprocket 26 may be used to drive other forms of seeders or other attachments for the tractor as will be understood.

The sprocket 26 may be adjusted inwardly or outwardly on the sleeve 14 by means of the set screw 27 so as to properly align it with the sprocket 30 as will be apparent.

Where instead of disk wheels the tractor has spoked wheels (Figure 5) it may not be desirable to bore the mounting holes for the spider mounting screws 9 described and in this case the spider arms 6a may be attached to the spokes L by clamps fitting around the spokes. As one construction (Figures 5 and 6) the ends of the arms 6a may be bent and formed at their outer ends to form clamp legs 31 and 32 joined by a bight 33 making up U-shaped clamps adapted to receive the wheel spokes L as shown. The legs 31 and 32 have aligned bolt apertures 34 through which clamp bolts 35 are placed and drawn up to clamp these legs tightly on the spokes as will be readily understood. Or in lieu of these integrally formed clamps separate U-shaped clamps 36 (Figure 7) may be employed comprising the legs 37 and 38 and connecting bights 39. The legs 37 and 38 are set astraddle or around the spokes L and spider arms 6a and are then drawn tight thereon by clamp bolts 40 exactly as in the case of the integrally formed legs. Obviously either form of clamp may be used and the arms 6a so arranged as to fit all kinds of tractor wheels and the clamps have sufficient play to permit the slight adjustment of the spider necessary to bring the shaft 12 into axial alignment with its supporting wheel.

If desired the pin 13 may be made removable to permit the shaft 12 and associated parts to be removed from the tractor wheel when desired without removing the spider 5.

It is thought that further details of the utility and operation of my invention will be apparent and while I have herein set forth certain preferred embodiments of my invention it is understood that I may vary from the same in minor structural details so as best to construct a practical device for the purposes intended, not departing from the spirit of the invention and within the scope of the appended claim.

I claim:

In a device of the kind described, a wheel spider including arms radially extended from a central hub and having means for adjustable attachment to the predetermined outer side of a tractor wheel having a hub, the arms being formed arcuately towards their hub so as to support that hub outwardly of and in axial alignment with the hub of the tractor wheel, a shaft rigidly and axially extended from the hub of the spider the same having a diametrically enlarged head at its outer end, a sleeve journaled freely on the shaft and having a rotative bearing at its outer end against the shaft head, the inner end of the sleeve being spaced somewhat from the spider hub and formed with clutch teeth therearound, a clutch collar slidably keyed on the inner end of the shaft between the sleeve and the spider hub the collar having teeth adapted to mesh with the teeth of the sleeve and having an annular race formed exteriorly thereof, an expansion coil spring on the inner end of the shaft between the clutch collar and spider hub for normally urging the clutch collar into engagement with the said sleeve, and a shifter fork engaged by the said race of the clutch collar as means for releasing the clutch from the sleeve.

CHARLES A. HITCHCOCK.